(12) United States Patent
Husson et al.

(10) Patent No.: US 11,216,561 B2
(45) Date of Patent: Jan. 4, 2022

(54) EXECUTING PROCESSES IN SEQUENCE

(71) Applicant: Hewlett-Packard Development Company, L.P., Spring, TX (US)

(72) Inventors: Remy Husson, Bristol (GB); Adrian Baldwin, Bristol (GB); Daniel Ellam, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

(21) Appl. No.: 16/470,283

(22) PCT Filed: Apr. 18, 2017

(86) PCT No.: PCT/US2017/028156
§ 371 (c)(1),
(2) Date: Jun. 17, 2019

(87) PCT Pub. No.: WO2018/194568
PCT Pub. Date: Oct. 25, 2018

(65) Prior Publication Data
US 2020/0034540 A1    Jan. 30, 2020

(51) Int. Cl.
*G06F 21/57* (2013.01)
*G06F 9/48* (2006.01)
*H04L 9/06* (2006.01)

(52) U.S. Cl.
CPC .............. *G06F 21/57* (2013.01); *G06F 9/485* (2013.01); *H04L 9/0643* (2013.01)

(58) Field of Classification Search
CPC ......... G06F 21/57; G06F 9/485; H04L 9/0643
See application file for complete search history.

(56) References Cited

U.S. PATENT DOCUMENTS

| 8,782,807 B2 | 7/2014 | Kiehtreiber |
| 9,141,788 B2 | 9/2015 | Horne et al. |
| 2009/0288161 A1 | 11/2009 | Wei et al. |
| 2010/0318639 A1 | 12/2010 | Jaquet et al. |

(Continued)

OTHER PUBLICATIONS

Thober, M. A. et al., "Ensuring the Integrity of Running Java Programs." Johns Hopkins APL technical digest 32, No. 2 (2013): 517.

(Continued)

*Primary Examiner* — Noura Zoubair
(74) *Attorney, Agent, or Firm* — Trop Pruner & Hu PC

(57) ABSTRACT

In an example, a machine-readable medium includes instructions that, when executed by a processor, cause the processor to order, as part of an execution of a trusted process, a plurality of processes into a sequence comprising a first process, at least one intermediate process, and a last process. The machine-readable medium may further comprise instruction to cause the processor to generate, as part of an execution of the first process, a value based on a code portion of the process following the first process in the sequence, and to generate, as part of an execution of each intermediate process, a respective value based on the value generated by the process preceding the intermediate process in the sequence and based on a code portion associated with the process following the intermediate process in the sequence.

20 Claims, 5 Drawing Sheets

(56) References Cited

U.S. PATENT DOCUMENTS

| | | | |
|---|---|---|---|
| 2015/0013002 A1* | 1/2015 | Smith | G06F 21/44 726/17 |
| 2015/0099510 A1 | 4/2015 | Shah et al. | |
| 2016/0191246 A1 | 6/2016 | Varadarajan et al. | |

OTHER PUBLICATIONS

Zhang, X. et al., "SecureBus: towards application-transparent trusted computing with mandatory access control." In Proceedings of the 2nd ACM symposium on Information, computer and communications security, pp. 117-126. ACM, 2007.

* cited by examiner

EXECUTING PROCESSES IN SEQUENCE

BACKGROUND

A processing device may execute a plurality of processes. One or more processes may be trusted process, such as for example executing in a trusted zone of a processor, whereas other process may not be trusted processes. Malicious programs may attempt to modify a non-trusted process to change its operation. For example, a malicious program may attempt to modify a process to change the behaviour of the processing device or to intercept sensitive information.

BRIEF DESCRIPTION OF DRAWINGS

Examples will now be described, by way of non-limiting example, with reference to the accompanying drawings, in which.

DETAILED DESCRIPTION

A processing device may execute a plurality of processes. At least one of the processes may be a trusted process. That is, for example, the trusted process is an operating system process that is difficult for non-operating system processes to modify, and/or the process resides within a trusted execution environment of a processing device, such as for example ARM® TrustZone®. In some examples, the trusted process may be or reside within a hypervisor that executes beneath one or more virtual machines. In some examples, a trusted process may not be able to access memory associated with another process, though the trusted process may be able to exchange information and messages with the other process. In some examples, some processes may execute outside of the trusted execution environment, but may still be critical processes. For example, such processes may include operating system processes, security agents (for compliance or malware detection) and/or anti-virus processes.

In some examples, a first process may be able to access a portion of memory associated with a second process and may generate a value based on the memory. For example, the memory may contain at least a part of the other process. The value generated may provide a representation of the memory. For example, the value may be a hash value of the memory. The value or a representation of the value, such as a further value that incorporates the value, may be provided to another process (such as for example a trusted process) that verifies the value or representation. For example, the value or representation is compared to an expected value or representation. If the verification fails, then the second process may have been modified, for example by malicious code, malware, or malfunctioning code. The processing device may take appropriate action in this case, for example halting execution of the second process, halting execution of all processes, or shutting down.

In some examples, the value generated by the first process is based on an information element. For example, the value is a hash value of the information element and a portion of memory associated with the second process. The information element may be based on a portion of memory associated with the first process. For example, the information element may be a hash value of the portion of memory associated with the first process, and may be received from another process. In this scenario, the value generated by the first process incorporates a representation of code associated with the first process as well as a representation of code associated with the second process. This increases the difficulty of undetected tampering of processes by a malicious program for example, as the malicious program may need to modify several processes to avoid detection.

Figure 1:
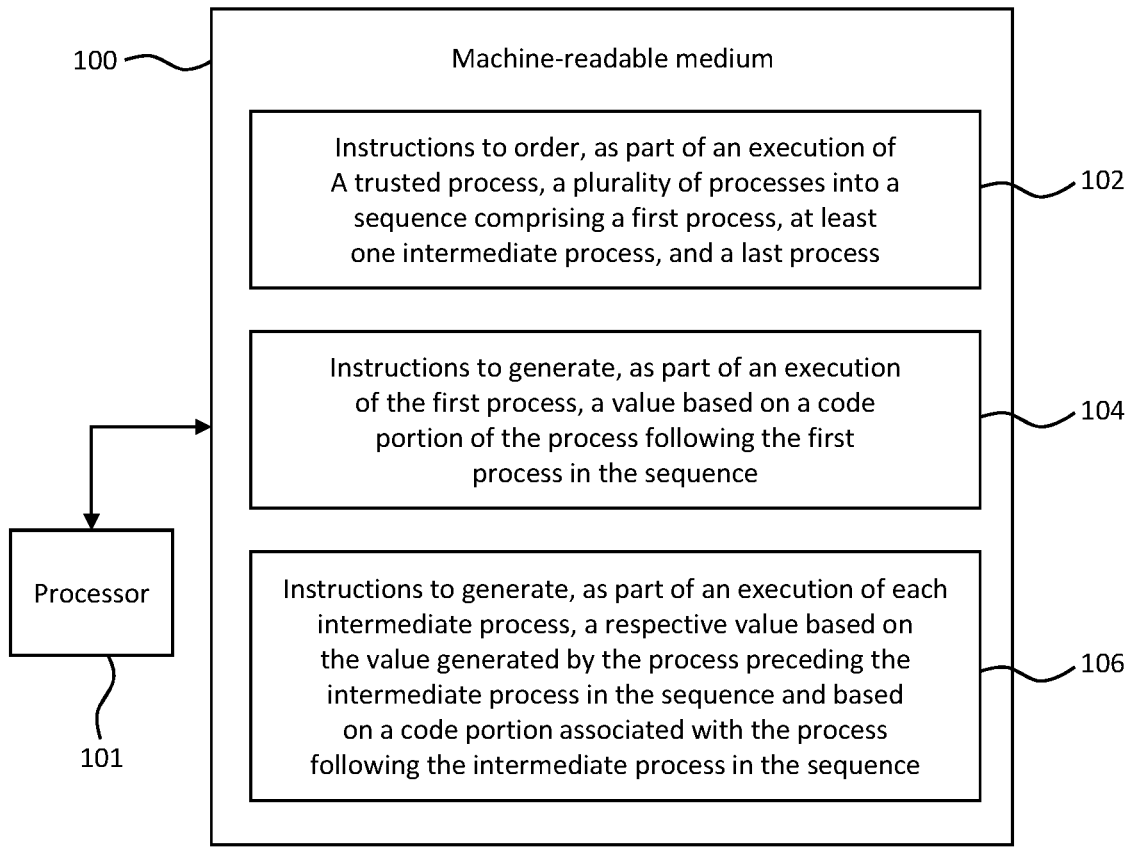
FIG. 1 is a simplified schematic of an example of a machine readable medium in association with a processor.

FIG. 1 shows an example of a machine-readable medium 100 that may be, for example, a machine-readable medium including instructions for verifying the integrity of a plurality of processes. The machine-readable medium 100 includes instructions 102 that, when executed by the processor 101, cause the processor 101 to order, as part of an execution of a trusted process, a plurality of processes into a sequence comprising a first process, at least one intermediate process, and a last process 106. In some examples, the order is chosen on in a random or pseudorandom manner. Choosing the order in a random manner may make it more difficult for a malicious or malfunctioning program to modify any of the first, intermediate and last processes, because a final value generated by the last process may be affected by the order of these processes.

The machine-readable medium 100 of FIG. 1 also includes instructions 104 that, when executed by a processor, cause the processor to generate, as part of an execution of the first process, a value based on a code portion of the process following the first process in the sequence (that is, the first one of the at least one intermediate process 204). In some examples, the value may be a hash value that is generated by running a hash function that has as an input a portion of memory containing at least part of the process following the first process in the sequence. In some examples, the first process may commence generating a value in response to an event, such as for example receiving an instruction from the trusted process. In some examples, the trusted process may send repeat instructions to the first process in the sequence for checking of the processes on an ongoing basis, such as periodically, and/or in response to an event such as for example possible detection of a malicious program.

In some examples, the value generated by the first process is also based on a seed, such as for example a random value, a pseudorandom value or a timestamp. In some examples, the value is generated using a hash function on the portion of memory associated with the next process in the sequence and also on the seed, which is for example the first or last data provided to the hash function. As a result, the value generated by the first process may be different if the instructions 102 are repeated. This may make it more difficult for a malicious program to modify any of the processes to avoid detection. For example, without the seed, the malicious program may be modify the second process to receive the value from the first process and to replace it with the correct value. This action may be thwarted if the value is modified using a seed.

The machine-readable medium 100 further includes instructions 106 that, when executed by a processor, cause the processor 101 to generate, as part of an execution of each intermediate process, a respective value based on the value generated by the process preceding the intermediate process in the sequence and based on a code portion associated with the process following the intermediate process in the sequence. As a result, for example, the value that is generated by the first process 202 is passed along the sequence of processes and 206, being modified into the respective value at each intermediate process. At the last intermediate process 204, the respective value (which may be referred to as the final value) is based on the process preceding the intermediate process in the sequence and based on a code portion associated with the last process. In some examples the final value is verified, for example by comparing the final value to an expected final value. The final value will differ from the expected final value if code associated with any of the processes has been modified, and hence such modification can be detected.

The value generated by a process may be provided to the next process in the sequence in some examples by providing the value directly to the process in a message, which may be for example a message instructing the next process to generate its own respective value, or for example by storing the value in a location in memory that is accessible by the next process. In some examples, where a process sends an instruction to the next process to generate its respective value, the process may determine which process is next by for example accessing a location in memory that provides this information. For example, the instructions 102 may include instructions such that the trusted process generates a table in memory that is accessible by the processes 202, 204 and 206 and indicates the sequence into which the processes are ordered. In some examples, the processes may be able to determine which is the next process. For example, each process may include a random or pseudorandom number generator that generates a random number to be used in determining the next process in the sequence. The first process may receive or retrieve a seed from the trusted process such that the seed determines the pseudorandom order of the processes.

In some examples, each process may be associated with a respective key. The instructions 104 and 106 may include instructions such that each process signs the value it generates with the appropriate key before the value is passed to the next process in the sequence. The keys may be generated by the trusted process and provided to or made accessible to each process, and may form part of a key pair, with the trusted process holding the other key of each pair such that the trusted process can verify the signatures. Using keys may make it more difficult for a malicious program to modify a process undetected, such as for example anticipate the value received from the preceding process in the sequence and replace it with a corrected value. In some examples, the keys may be modified by the trusted process between repeat executions of the instructions within the machine-readable medium 100 to avoid the processes generating identical values in repeat executions.

In some examples, there may be only one intermediate process. In this case, the instructions 104 may comprise instructions that, when executed by a processor, cause the processor to generate, as part of an execution of the intermediate process 204, a respective value based on the value generated by the first process and based on a code portion associated with the last process.

Figure 2:
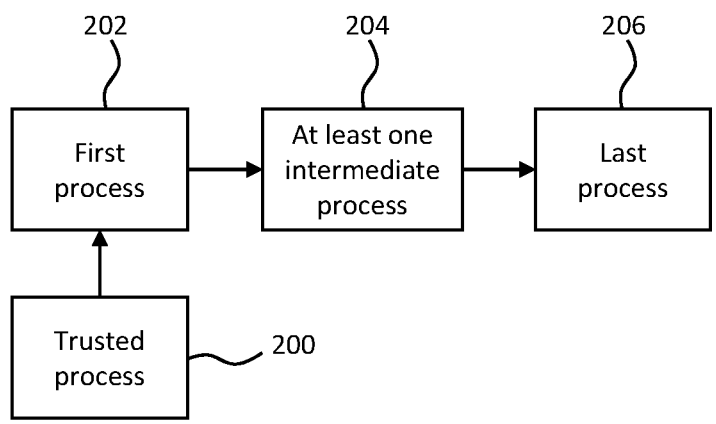
FIG. 2 is a simplified schematic of an example of processes.

FIG. 2 shows an example of a trusted process 200, a first process 202, a second process 204 and a last process 206. The processes 202, 204 and 206 have been ordered into a sequence.

Figure 3:
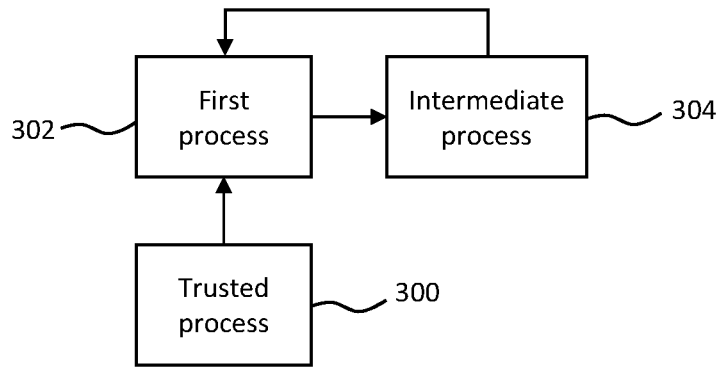
FIG. 3 is a simplified schematic of another example of processes.

In some examples, the last process may be the first process (i.e. the processes may form a closed loop). FIG. 3 shows an example of processes including a trusted process 300, a first process 302 and an intermediate process 304. The first process 302 is also the last process in the sequence. In this case, the instructions 104 may comprise instructions that, when executed by a processor, cause the processor to generate, as part of an execution of the intermediate process 204, a respective value based on the value generated by the first process and based on a code portion associated with the first process. The final value generated by the intermediate process 304 may be based on code portions associated with both the first process 302 and the intermediate process 304. In some examples, where the first process is also the last process, there may be multiple intermediate processes 304.

Figure 4:
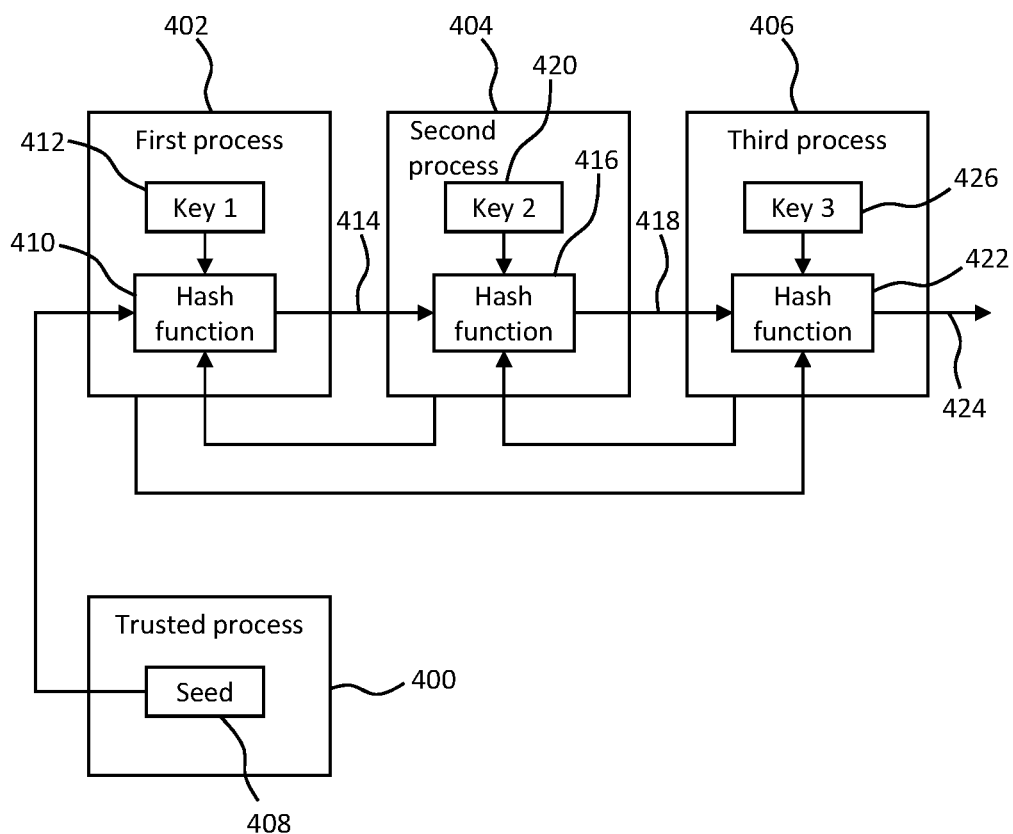
FIG. 4 is a simplified schematic of a further example of processes.

FIG. 4 shows an example of processes including a trusted process 400 and a first process 402. Intermediate processes comprise a second process 404 and third process 406. In this example, the first process 402 is also the last process.

The trusted process 400 generates a seed 408 that is provided to a hash function 410 of the first process 402. The hash function 410 generates a value 414 based on the seed 408, a code portion associated with the second process 404, and a first key 412 associated with the first process 402. The value 414 is passed to the second process 404.

The second process 404 includes a hash function 416 that generates a value 418 based on the value 414, a code portion associated with the third process 406, and a key 420 associated with the second process 404. The value 418 is passed to the third process 406.

The third process 406 includes a hash function 422 that generates a value 424 based on the value 418, a code portion associated with the first process 402, and a key 426 associated with the third process 406. The value 424 is the final value that may be verified to determine the integrity of the first process 402, the second process 404 and the third process 406. If the final value 424 differs from an expected final value, this may indicate that at least one of the processes 402, 404 and 406 has been modified.

In some examples, the final value 424 is provided to the trusted process 400, such as for example being provided by the third process 406, or being provided to the first process 402 which forwards the final value to the trusted process 400. The trusted process may compare the final value 424 with an expected final value to verify the integrity of the processes 402, 404 and 406. In some examples, the trusted process 400 may generate the expected final value based on the seed 408, the keys 412, 420 and 426 and the expected output of the hash functions 410, 416 and 422, and may compare the expected final value to the received final value.

Figure 5:
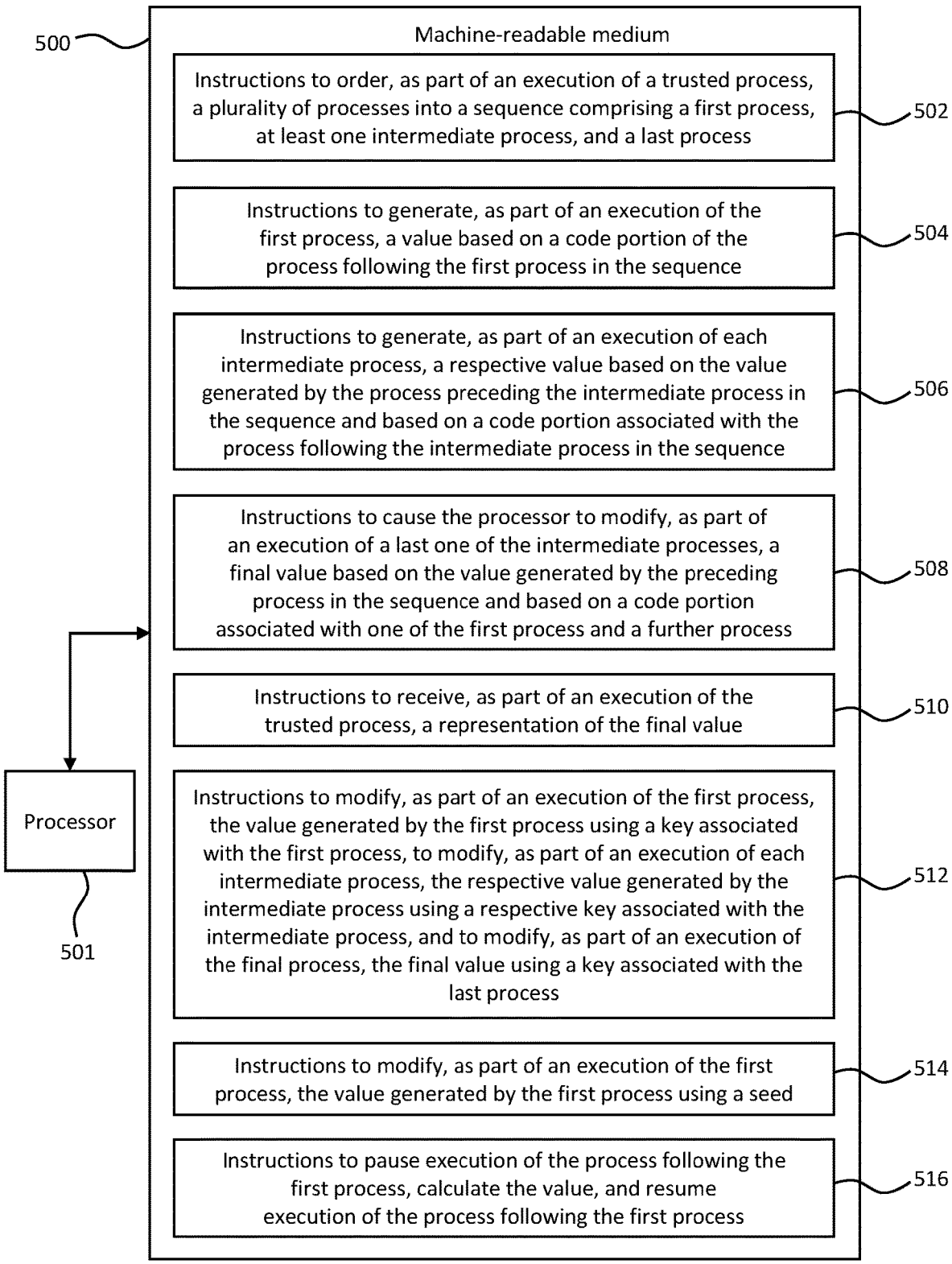
FIG. 5 is a simplified schematic of an example of a machine-readable medium in association with a processor.

FIG. 5 shows an example of a machine-readable medium 500 that may be, for example, a machine-readable medium including instructions for verifying the integrity of a plurality of processes. The machine-readable medium includes instructions 502, 504 and 506 that correspond to the instructions 102, 104 and 106 respectively shown in FIG. 1. The machine-readable medium 500 also includes instructions 508 that, when executed by a processor 501, cause the processor to modify, as part of an execution of a last one of the intermediate processes, a final value based on the value generated by the process preceding the intermediate process in the sequence and based on a code portion associated with one of the first process and a further process. Hence, the "last" process in the sequence can be the first process or another process, and the final value is based on the code of this process.

The machine-readable medium 500 also includes instructions 510 that, when executed by a processor, cause the processor to receive, as part of an execution of the trusted process, a representation of the final value. The trusted process may compare this representation to an expected value to verify it. The representation of the final value may in some examples be the final value.

The machine-readable medium 500 also includes instructions 512 that, when executed by a processor 501, cause the processor to modify, as part of an execution of the first process, the value generated by the first process using a key associated with the first process, to modify, as part of an execution of each intermediate process, the respective value generated by the intermediate process using a respective key associated with the intermediate process, and to modify, as part of an execution of the last process, the final value using a key associated with the last process. Therefore, as described above with reference to the example shown in FIG. 4, the value can be "protected" by signing with keys as it gets passed between processes. As a result, for a malicious program to modify a process, it may need access to all of the keys as well as other information (such as for example the order of the processes) to be able to disguise any modifications to the process by replacing an incorrect value with a corrected one.

The machine-readable medium 500 also includes instructions 514 that, when executed by a processor 501, cause the processor to modify, as part of an execution of the first process, the value generated by the first process using a seed. The final value may then be based on the seed as well as other information (such as for example the code portions in memory of the processes) to ensure that the final value varies between repeat cycles of a procedure for determining process integrity, and the final value cannot be forged by for example an altered process.

The machine-readable medium 500 also includes instructions 516 that, when executed by a processor 501, cause the processor to pause execution of the process following the first process, calculate the value, and resume execution of the process following the first process. In this case, a process can create a value based on a portion of memory around which execution of the next process is paused. This may prevent a scenario in which a malicious program modifies a process and keeps an unmodified version of the process elsewhere in memory to ensure that the preceding process in the sequence generates the correct value from the unmodified code. By taking into account the location of execution of a process, it can be ensured that the executing version of a process is considered and not a copy of it. In some examples, the process being paused may always pause at the same point, such that the region of memory that contains that process may remain in the same place relative to the pause point. The process being paused may include code to ensure that the process pauses at the same point. The presence of a pause may be taken into account when determining a schedule for performing checks.

In some examples, a first process that checks the next process (that is, creates a value based on a portion of memory containing at least part of the next process) may send an interrupt signal to the next process to pause it, wait for the next process to be paused, create the value, and instruct the next process to perform the same actions in respect of its own next process. The first process may then resume execution of the next process from the point at which it was paused, though this may occur after the next process has completed its actions in respect of its own next process. In some examples, all processes in the sequence may be paused before the first process starts checking its next process in the sequence, and all the processes may be resumed from their respective pause points once the final value has been created.

Figure 6:
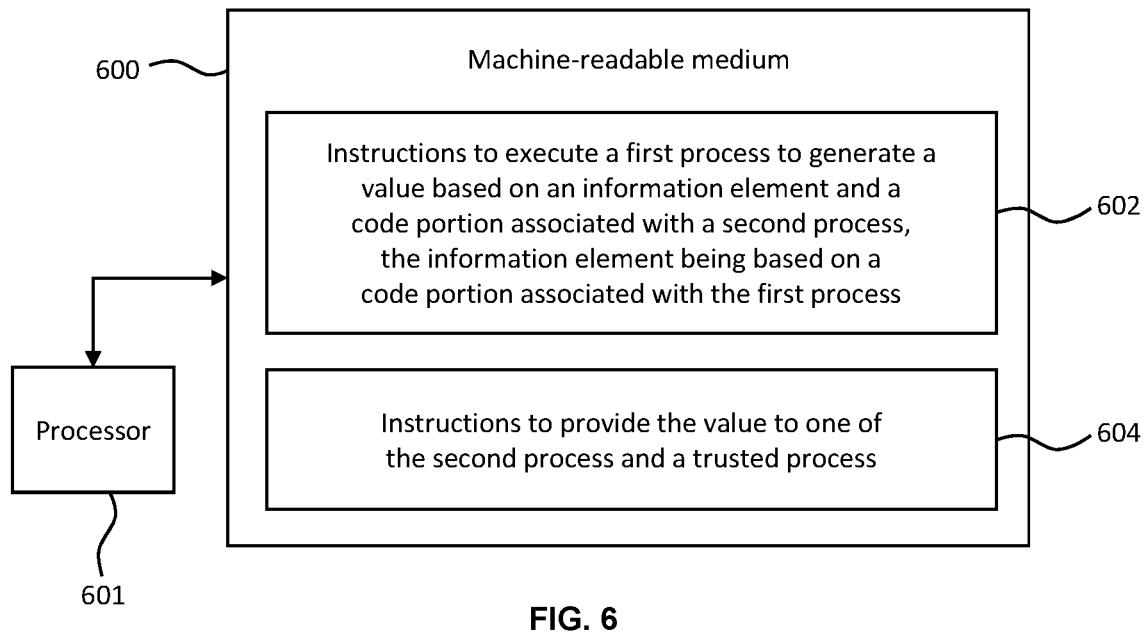
FIG. 6 is a simplified schematic of another example of a machine-readable medium in association with a processor.

FIG. 6 shows an example of a machine-readable medium 600 storing instructions that may be, for example, instructions executed by a processor 601 during verification of the integrity of a plurality of processes. The machine-readable medium 600 includes instructions 602 that, when executed by the processor 601, cause the processor to execute a first process to generate a value based on an information element and a code portion associated with a second process, the information element being based on a code portion associated with the first process. As such, the value is based on the code of both the first process and the second process. The machine-readable medium 600 also includes instructions 604 that, when executed by the processor 601, cause the processor to provide the value to one of the second process and a trusted process. Therefore, the second process may in some examples go on to create a further value that incorporates a representation of code of a third process, or the trusted process may verify the value from the first process.

Figure 7:
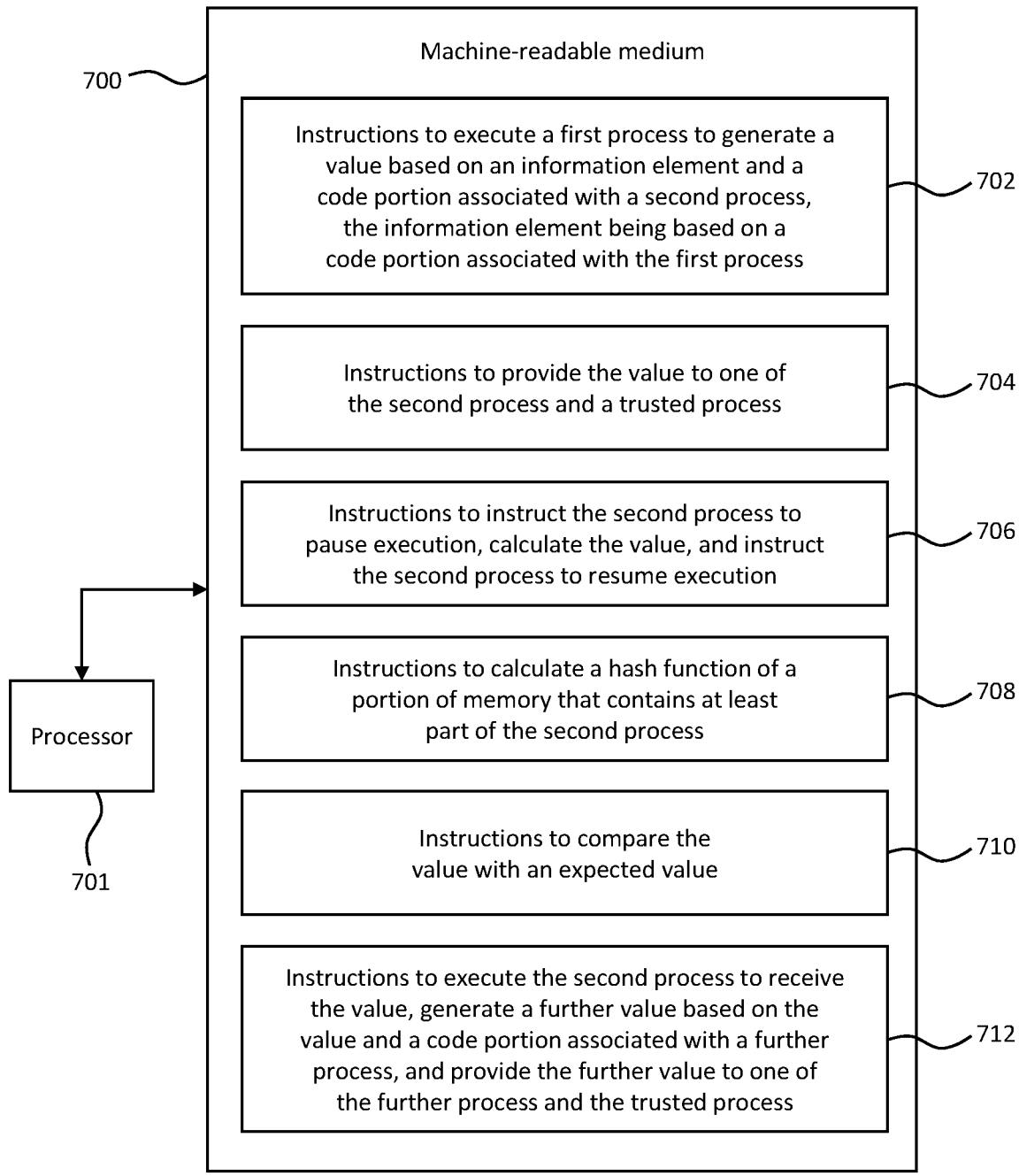
FIG. 7 is a simplified schematic of a further example of a machine-readable medium in association with a processor.

FIG. 7 shows an example of a machine-readable medium 700 storing instructions that may be, for example, instructions executed by a processor 701 during verification of the integrity of a plurality of processes. The machine-readable medium 700 includes instructions 702 that, when executed by a processor 701, cause the processor to execute a first process to generate a value based on an information element and a code portion associated with a process, the information element being based on a code portion associated with the first process. The first process may for example receive a value (the information element) based on its own code, modify it based on code of the second process, and forward the modified value to the second process or a trusted process. Modification of the first or second process may therefore in some examples be revealed by the modified value being different from the expected modified value.

The machine-readable medium also comprises instructions 704 that, when executed by a processor 701, cause the processor to provide the value generated by the first process to one of the second process and a trusted process. The second process may further modify the value, or the trusted process can verify the value.

The instructions 702 may comprise instructions 706 that, when executed by a processor 701, cause the processor to instruct the second process to pause execution, calculate the value, and instruct the second process to resume execution. As indicated above, the value may be based on a code portion of an executing process instead of an unmodified copy of that process.

The instructions 702 may comprise instructions 708 that, when executed by a processor 701, cause the processor to instruct the second process to calculate a hash function of a portion of memory that contains at least part of the second process. The value may then depend on a code portion of the second process and therefore any modification of the second process will be reflected in the value.

The machine-readable medium also comprises instructions 710 that, when executed by a processor, cause the processor to compare the value with an expected value. If the value differs from the expected value, this may indicate that the first process or the second process has been modified, for example by a malicious process. In some examples, action may subsequently be taken if the value is unexpected, such as terminating one or more processes, or pausing or shutting down a processing device that is executing instructions from the machine-readable medium 700.

The machine-readable medium also comprises instructions 712 that, when executed by a processor, cause the processor to execute the second process to receive the value, generate a further value based on the value and a code portion associated with a further process, and provide the further value to one of the further process and the trusted process. As a result, in some examples, the further value can be based on code portions associated with the first process, the second process and the further process, and modification of any of these processes may be revealed in the further value generated by the second process.

Figure 8:
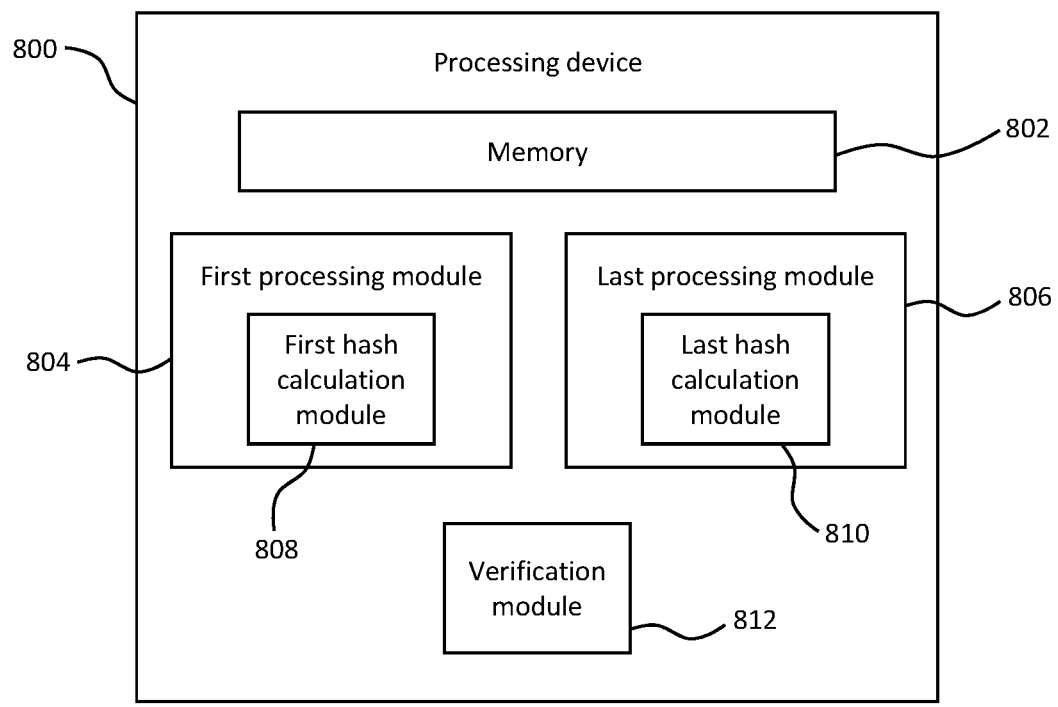
FIG. 8 is a simplified schematic of a processing device.

FIG. 8 shows an example of a processing device 800 that may for example determine the integrity of running processes. The processing device 800 comprises a memory 802 and a plurality of ordered processing modules. The plurality of ordered processing modules are ordered into a sequence and include a first processing module 804 and a second processing module 806.

The first processing module 804 in the sequence includes a first hash calculation module 808 to calculate a hash value of a portion of the memory 802 associated with the next processing module. This may be the last processing module 806, or an intermediate processing module in some examples.

The last processing module 806 includes a last hash calculation module 810 to calculate a hash value from the hash value calculated by its preceding processing module (which may be the first processing module 804 or an intermediate processing module) and a hash value of a portion of the memory associated with the first processing module 802 or another processing module. A verification module 812 may verify the hash value calculated by the last hash calculation module 810. For example, the hash value is compared with a predicted hash value. If a discrepancy is detected, which may indicate that one of the processing modules has been modified, then the verification module may in some examples take action, such as shutting down the processing device 800, shutting down one or more of the processing modules, and/or presenting a message to a user of the processing device 800.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A non-transitory machine-readable medium comprising instructions that, when executed by a processor, cause the processor to:

order, as part of an execution of a trusted process, a plurality of processes into a sequence comprising a first process, a second process, and a third process;

generate, as part of an execution of the first process, a first value obtained by applying a hash function on a code portion of the second process following the first process in the sequence;

generate, as part of an execution of the second process, a second value obtained by applying a hash function on the first value generated by the first process preceding the second process in the sequence and on a code portion of the third process following the second process in the sequence;

generate, as part of an execution of an intermediate process preceding a last process in the sequence, a final value obtained by applying a hash function on a value generated by a further process preceding the intermediate process in the sequence, and on a code portion of the last process; and provide a representation of the final value to the trusted process for verification of the final value.

2. The non-transitory machine-readable medium of claim 1, comprising instructions that when executed cause the processor to:

modify, as part of the execution of the second process, the second value; and send the modified second value to the third process.

3. The non-transitory machine-readable medium of claim 1, wherein the last process is the first process.

4. The non-transitory machine-readable medium of claim 1, wherein ordering the plurality of processes into the sequence comprises randomizing an order of the plurality of processes in the sequence.

5. The non-transitory machine-readable medium of claim 1, comprising instructions that when executed cause the processor to:

modify, as part of the execution of the first process, the first value using a key associated with the first process; and modify, as part of the execution of the second process, the second value using a key associated with the second process.

6. The non-transitory machine-readable medium of claim 2, comprising instructions that when executed cause the processor to modify, as part of the execution of the second process, the second value using a seed.

7. The non-transitory machine-readable medium of claim 1, comprising instructions that when executed cause the processor to, as part of the execution of the trusted process, verify the final value.

8. The non-transitory machine-readable medium of claim 1, comprising instructions that when executed cause the processor to, as part of the execution of the first process, pause the execution of the second process, calculate the first value after pausing the second process, and resume the execution of the second process after calculating the first value.

9. The non-transitory machine-readable medium of claim 1, wherein the intermediate process is the second process, the last process is the third process, the further process is the first process, and the final value is the second value.

10. The non-transitory machine-readable medium of claim 6, wherein the seed comprises a random value.

11. A method of a system comprising a hardware processor, comprising:

generating, as part of an execution of a first process in a sequence of processes, a first value obtained by applying a hash function on an information element and a code portion associated with a second process following the first process in the sequence of processes, the information element being based on a code portion associated with the first process;

generating, as part of an execution of the second process, a second value obtained by applying a hash function on the first value and on a code portion associated with a third process following the second process in the sequence of processes;

generate, as part of an execution of an intermediate process preceding a last process in the sequence, a final value obtained by applying a hash function on a value generated by a further process preceding the intermediate process in the sequence, and on a code portion of the last process; and provide a representation of the final value to a trusted process for verification of the final value.

12. The method of claim 11, comprising, as part of the execution of the first process, pausing the execution of the second process, calculating the first value after pausing the execution of the second process, and resuming the execution of the second process after calculating the first value.

13. The method of claim 11, wherein the information element is further based on a seed.

14. The method of claim 11, wherein the last process is the first process.

15. The method of claim 11, comprising comparing the final value with an expected value.

16. The method of claim 11, wherein the intermediate process is the second process, the last process is the third process, the further process is the first process, and the final value is the second value.

17. A device comprising:

a memory to store a plurality of processing modules ordered in a sequence, the sequence including a first processing module, a second processing module, and a last processing module;

a processor;

the first processing module executable on the processor and including a first hash calculation module to calculate a first hash value of a portion of the memory containing the second processing module following the first processing module in the sequence;

the second processing module executable on the processor and including a hash calculation module to calculate a final hash value from the first hash value calculated by the first processing module and a portion of the memory containing program code of the last processing module following the second processing module in the sequence; and a verification module executable on the processor to verify the final hash value calculated by the second processing module in the sequence.

18. The device of claim 17, wherein the first processing module is to sign the first hash value with a first key and provide a signed version of the first hash value to the second processing module.

19. The device of claim 17, wherein the processor is to randomly order the plurality of processing modules to form the sequence.

20. The device of claim 17, wherein the sequence including the plurality of processing modules includes a further processing module preceding the first processing module.

* * * * *